(12) United States Patent
Wei et al.

(10) Patent No.: US 12,532,397 B2
(45) Date of Patent: Jan. 20, 2026

(54) DISCHARGE DEVICE

(71) Applicant: MIDAS WEI TRADING CO., LTD., Taipei (TW)

(72) Inventors: Tao-Chin Wei, Taoyuan County (TW); Yuan-Ping Liu, Taipei (TW); Yi-Cheng Liu, Taipei (TW)

(73) Assignee: Midas Wei Trading Co., Ltd., Taipei (TW)

( * ) Notice: Subject to any disclaimer, the term of this patent is extended or adjusted under 35 U.S.C. 154(b) by 139 days.

(21) Appl. No.: 18/510,928

(22) Filed: Nov. 16, 2023

(65) Prior Publication Data
US 2024/0164003 A1    May 16, 2024

(30) Foreign Application Priority Data
Nov. 16, 2022 (TW) .................................. 111143674

(51) Int. Cl.
     *H02H 1/00*      (2006.01)
     *H02H 1/04*      (2006.01)
     *H02H 3/22*      (2006.01)
     *H05F 3/00*      (2006.01)
     *H05F 3/02*      (2006.01)
     *H05F 3/04*      (2006.01)
     *F16L 57/00*      (2006.01)

(52) U.S. Cl.
     CPC ................. *H05F 3/04* (2013.01); *H05F 3/02* (2013.01); *F16L 57/00* (2013.01)

(58) Field of Classification Search
CPC .... H05F 3/04; H05F 3/02; F16L 57/00; F16L 7/00
USPC .......................................................... 361/212
See application file for complete search history.

(56) References Cited

U.S. PATENT DOCUMENTS

| | | | | |
|---|---|---|---|---|
| 2,333,213 A | * | 11/1943 | Games ..................... | H05F 3/04 |
| | | | | 250/326 |
| 3,863,679 A | * | 2/1975 | Young ..................... | F16L 1/026 |
| | | | | 285/123.14 |
| 5,946,088 A | * | 8/1999 | Aldridge ............... | B01F 35/213 |
| | | | | 356/300 |

(Continued)

*Primary Examiner* — Danny Nguyen
*Assistant Examiner* — Lucy M Thomas
(74) *Attorney, Agent, or Firm* — Rosenberg, Klein & Lee

(57) ABSTRACT

An electrostatic discharge device including at least two conductive materials isolated from each other and at least one electrostatic eliminator. The conductive materials are located outside two opposite side walls of an insulated fluid-carrying member and separated from the side walls thereof. When electrostatic charges are accumulated on the insulated fluid-carrying member, the electrostatic charges form an electrostatic voltage on the conductive materials. The electrostatic eliminator is electrically connected to the conductive materials and directly disconnected from a grounding terminal. The electrostatic eliminator releases and eliminates the electrostatic charges by the conductive materials to reduce the electrostatic voltage. In addition, the insulated fluid-carrying member can also be replaced by an insulation container. When the insulation container is used, induction electrodes can replace the conductive materials in the insulation container. The electrostatic discharge device effectively releases static electricity and avoids noise interference from the grounding terminal.

10 Claims, 16 Drawing Sheets

(56) References Cited

U.S. PATENT DOCUMENTS

2005/0103393 A1* 5/2005 Foxton ................. F16L 59/143
                                                            138/148
2020/0236766 A1* 7/2020 Wei ........................... H05F 3/04

* cited by examiner

DISCHARGE DEVICE

This application claims priority of Application No. 111143674 filed in Taiwan on 16 Nov. 2022 under 35 U.S.C. § 119; the entire contents of all of which are hereby incorporated by reference.

BACKGROUND OF THE INVENTION

Field of the Invention

The present invention relates to a discharge device, and in particular to an electrostatic discharge device.

Description of the Prior Art

Static electricity is a phenomenon caused by an unbalanced distribution of electric charges in an electrically neutral object. Friction between two originally electrically neutral objects can cause electron transfer and thus generate static electricity. In a delivery pipeline of a liquid, when the liquid and materials of the delivery pipeline both have high resistivity, static electricity is easily generated due to friction between the liquid and an inner wall of the delivery pipeline, thereby causing fire or breakdown of peripheral electronic devices. Especially when the liquid is flammable, it is easy to cause safety problems such as fires.

In order to reduce the possibility of static electricity generation, many delivery pipelines or liquid containers are often made of metal materials, so as to avoid harm caused by static electricity. However, rubber and plastic pipes have multiple advantages such as light weight, low cost, insulation, and ease of processing, and can effectively reduce costs. In addition, when the delivery fluid has strong acidity or alkalinity, metal pipelines or metal containers may be corroded, resulting in contamination of the fluid with residual metals. For example, in a semiconductor manufacturing process, strong acid or strong base alkali is usually required, and can easily corrode a metal pipe wall, causing metal to release and contaminate semiconductor wafers along with the delivery liquid, leading to the manufacturing process failure. Under these application scenarios, it is desirable to use Teflon pipelines or carbon nanotubes having corrosion resistance and high resistivity.

Another common scenario for using pipelines having high resistivity is flexible pipelines or hoses. For example, a flexible hose is often used as a buffer pipeline between a pump and the delivery pipeline. The function of a pump is to move the liquid, and the flexible hose itself will deform or move back and forth as the liquid moves. At this point, both the delivery liquid and the pipeline are in motion, which may double the amount of friction, causing the double generation of an electrostatic charges. As the pump is typically at a node of the pipeline, the terminal accumulation effect of the pipeline causes more electrostatic charges to be detected at this node than at other locations in the pipeline. The driving device of the pump may be a motor or an electronic product, which is easily damaged due to static electricity. In addition to the flexible pipelines, rotating pipelines or stirring devices also have double friction and terminal accumulation properties, resulting in the generation of more electrostatic charges.

There are several common methods for reducing the amount of static electricity in a pipeline.

1. Reducing the amount of deformation, the amount of movement, or the speed of rotation of the pipeline itself. Electrostatic charges inside the pipeline are mainly generated by friction between the liquid and the inner pipe wall. Reducing the amount of deformation, the amount of movement or the speed of rotation of the pipeline can effectively reduce the amount of friction between the liquid and the inner pipe wall. However, the movement or rotation speed of the pipeline often has certain requirements in specific manufacturing processes, and it is not possible to reduce the pipeline speed without limitation. Decreasing the speed usually represents a reduction in production efficiency at the same time, and reducing the movement or rotation speed of the pipeline is not the best strategy.

2. Reducing the flow rate of a liquid. Reducing the flow rate of a liquid can also effectively reduce the friction amount, but is often limited by the manufacturing process and cannot be decelerated arbitrarily.

3. Grounding after wrapping the pipeline with a composite conductive film. Laying a layer of conductive material outside the delivery pipe, the conductive material is used to sense and collect electric charges, and then ground to dissipate the electric charges. This method does have the effect of eliminating the electric charges. In fact, static electricity continuously accumulates due to the action of a delivery pipe, and the static electricity to be eliminated tends to be over 10000 volts, so that the effect of direct grounding is limited, and in particular, the dissipation speed is rather slow. Sometimes, some noise flows into conductive materials from the grounding terminal to interfere with peripheral electronic products. In addition, when the delivery pipeline itself rotates, there is a risk of the grounding wire being entangled or broken, causing a challenge to the reliability of direct grounding.

Therefore, in view of the above, the present invention provides an electrostatic discharge device in order to solve the problems of the prior art.

SUMMARY OF THE INVENTION

The present invention provides an electrostatic discharge device, thereby effectively dissipating an extremely high electrostatic voltage and avoiding noise interference of a grounding terminal.

In order to achieve the above object, the present invention provides an electrostatic discharge device including at least two conductive materials and at least one electrostatic eliminator. The conductive materials are isolated from each other, located outside two opposite side walls of an insulated fluid-carrying member and separated from the side walls of the insulated fluid-carrying member. When a fluid carrying electrostatic charges flows in the insulated fluid-carrying member and frictionates the insulated fluid-carrying member, the electrostatic charges are accumulated on the insulated fluid-carrying member and form an electrostatic voltage on the conductive materials, a capacitance value between the conductive materials and a dielectric substance of the conductive materials is greater than 0.2 picofarad (pF). The electrostatic eliminator is electrically connected to the conductive materials and directly disconnected from a grounding terminal. The electrostatic eliminator is configured to release and eliminate the electrostatic charges by means of the conductive materials so as to reduce the electrostatic voltage.

In one embodiment of the present invention, the electrostatic discharge device further includes an external capacitor, both ends of the external capacitor are electrically connected to the conductive materials respectively, and the external capacitor and the conductive materials are configured to collect the electrostatic charges.

In one embodiment of the present invention, the electrostatic discharge device further includes a gas discharge tube electrically connected between the grounding terminal and the electrostatic eliminator, and the gas discharge tube is configured to release and eliminate the electrostatic charges.

In one embodiment of the present invention, the electrostatic discharge device further includes a hollow insulated sleeve sleeved with the insulated fluid-carrying member and separated from the insulated fluid-carrying member, and the conductive materials are directly attached to an inner wall or an outer wall of the hollow insulated sleeve.

In one embodiment of the present invention, the electrostatic eliminator includes at least one metal oxide varistor, a thermistor, and a gas discharge tube. The metal oxide varistor has a first end and a second end, and the first end and the second end of the metal oxide varistor are electrically connected to the conductive materials respectively. The thermistor has a three end and a four end, and the third end of the thermistor is electrically connected to the first end of the metal oxide varistor. Both ends of the gas discharge tube are electrically connected to the fourth end and the second end respectively. When the electrostatic voltage is greater than a rated voltage between the metal oxide varistor and the at least one gas discharge tube, the metal oxide varistor, the thermistor and the gas discharge tube release are configured to release and eliminate the electrostatic charges so as to reduce the electrostatic voltage.

In one embodiment of the present invention, the thermistor is a positive temperature coefficient (PTC) thermistor or a polymer positive temperature coefficient (PPTC) thermistor.

In one embodiment of the present invention, the at least one gas discharge tube includes two gas discharge tubes, and the rated voltages of the gas discharge tubes are different. The at least one electrostatic eliminator further includes a current collection capacitor. The current collection capacitor electrically connected in parallel to the gas discharge tube; and an equivalent capacitance is formed between the conductive materials and the dielectric substance of the conductive materials. The capacitance value of the current collection capacitor is greater than ten times the capacitance value of the equivalent capacitor. When the electrostatic voltage is less than the rated voltage between the metal oxide varistor and all the gas discharge tubes, the electrostatic charges are first transferred from the insulated fluid-carrying member to the current collection capacitor by means of the thermistor. When the electrostatic voltage is greater than the rated voltage between the metal oxide varistor and all the gas discharge tubes, the metal oxide varistor, the thermistor and all the gas discharge tubes then release and eliminate the electrostatic charges so as to reduce the electrostatic voltage.

In one embodiment of the present invention, the conductive materials are metal sheets, conductive adhesive tapes, conductive adhesive, conductive paint, or metal electroplating materials.

In one embodiment of the present invention, the insulated fluid-carrying member is an insulation container or an insulated hollow pipeline.

In one embodiment of the present invention, the insulated fluid-carrying member is a sealed insulation container, and when the sealed insulation container moves, the fluid carrying the electrostatic charges flows in the sealed insulation container and frictionates the sealed insulation container.

In one embodiment of the present invention, the sealed insulation container is fixed on a rotating shaft running through the sealed insulation container, and each of the conductive materials is a circular conductive material surrounding the rotating shaft.

In one embodiment of the present invention, the electrostatic discharge device further includes an insulated accommodation sleeve accommodating the rotating shaft, the sealed insulation container, and the annular conductive material, and the annular conductive material is fixed in the insulation accommodation sleeve.

In one embodiment of the present invention, an electrostatic discharge device includes at least two electrode structures and at least one electrostatic eliminator. All the electrode structures are located on an inner wall of an insulation container, and the positions of all the electrode structures correspond to each other. When a fluid carrying electrostatic charges flows in the insulation container and frictionates the insulation container, the electrostatic charges are accumulated on the insulation container. Each of the electrode structures includes a sensing electrode and an insulation cover covering the sensing electrode, and the electrostatic charges form an electrostatic voltage on the sensing electrodes of the electrode structures. A capacitance value between the sensing electrodes of all the electrode structures and a dielectric substance of the electrode structures is greater than 0.2 picofarad (pF). The electrostatic eliminator is electrically connected to the sensing electrodes of all the electrode structures and directly disconnected from a grounding terminal. The electrostatic eliminator is configured to release and eliminate the electrostatic charges by means of the sensing electrodes of the electrode structures so as to reduce the electrostatic voltage.

In one embodiment of the present invention, the at least two electrode structures include a plurality of electrode structures of which the number is greater than two, and the number of all the two electrode structures is an even number.

In one embodiment of the present invention, all the electrode structures are located at the same horizontal position.

In one embodiment of the present invention, all the electrode structures are uniformly located on an inner wall of an insulation container.

In one embodiment of the present invention, the electrostatic eliminator includes at least one metal oxide varistor, a thermistor, and a gas discharge tube. The metal oxide varistor has a first end and a second end, and the first end and the second end of the metal oxide varistor are electrically connected to the sensing electrodes of the electrode structures respectively. The thermistor has a three end and a four end, and the third end of the thermistor is electrically connected to the first end of the metal oxide varistor. Both ends of the gas discharge tube are electrically connected to the fourth end and the second end respectively. When the electrostatic voltage is greater than a rated voltage between the metal oxide varistor and the at least one gas discharge tube, the metal oxide varistor, the thermistor and the gas discharge tube release are configured to release and eliminate the electrostatic charges so as to reduce the electrostatic voltage.

In one embodiment of the present invention, the thermistor is a positive temperature coefficient thermistor or a polymer positive temperature coefficient thermistor.

In one embodiment of the present invention, the at least one gas discharge tube includes two gas discharge tubes, and the rated voltages of the gas discharge tubes are different. The at least one electrostatic eliminator further includes a current collection capacitor electrically connected in parallel to the gas discharge tubes; an equivalent capacitance is formed between the sensing electrodes of all electrode structures and the dielectric substance of all electrode structures; and the capacitance value of the current collection capacitor is greater than ten times the capacitance value of the equivalent capacitor. When the electrostatic voltage is less than the rated voltage between the metal oxide varistor and all the gas discharge tubes, the electrostatic charges are first transferred from the insulation container to the current collection capacitor by means of the thermistor. When the electrostatic voltage is greater than the rated voltage between the metal oxide varistor and all the gas discharge tubes, the metal oxide varistor, the thermistor and all the gas discharge tubes then release and eliminate the electrostatic charges so as to reduce the electrostatic voltage.

Based on the above, the electrostatic discharge device uses at least two conductive materials or at least two sensing electrodes isolated from each other to effectively dissipate an extremely high electrostatic voltage from an insulated fluid-carrying member or an insulation container and avoid noise interference at a grounding terminal.

In order to make the structural features and the achieved effects of the present invention more apparent and appreciated by the examiner, a detailed description of preferred embodiments and combinations will be given as follows.

DESCRIPTION OF THE PREFERRED EMBODIMENTS

Figure 1:
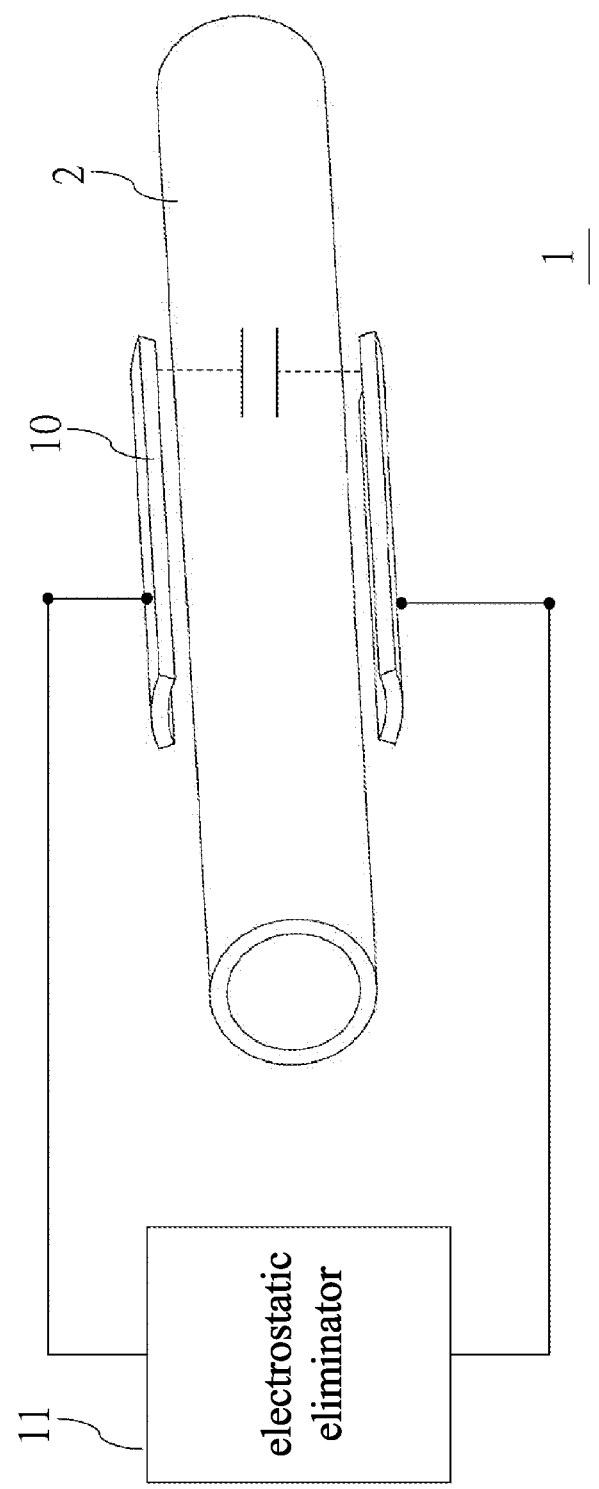
FIG. 1 is a schematic diagram of a first embodiment of an electrostatic discharge device of the present invention.

Embodiments of the present invention will be further illustrated below with reference to the accompanying drawings. As far as possible, in the drawings and the description, identical reference numerals represent identical or similar components. In the drawings, shapes and thicknesses may be exaggerated based on simplification and convenient labeling. It will be understood that elements that are not specifically shown in the drawings or described in the description are known in a form known to those skilled in the art. Those skilled in the art can make various changes and modifications according to the contents of the present invention.

When an element is referred to as being "on", it may be generally referred to as being "directly on" other components or having other components present therebetween. Conversely, when an element is referred to as being "directly on" another element, it is not possible for other elements to be present therebetween. As used herein, the term "and/or" includes any combination of one or more of the listed associated items.

The following description of "one embodiment" or "an embodiment" refers to a particular element, structure, or characteristic associated with at least one embodiment. Therefore, multiple descriptions of "one embodiment" or "an embodiment" appearing in multiple places below are not intended to be directed to the same embodiment. Furthermore, the particular features, structures, and characteristics of one or more embodiments may be combined in an appropriate manner.

The present disclosure is described in particular with respect to the following examples, which are intended to be illustrative only. For those skilled in the art, various modifications and embellishments can be made without departing from the spirit and scope of the disclosure. Therefore, the scope of protection of the disclosure shall be determined as defined by the appended claims. In the context of the description and claims, unless the context clearly dictates otherwise, the meaning of "a" and "the" include that such recitation includes "one or at least one" element or component. Furthermore, as used in this disclosure, the singular articles also include the recitation of plural elements or components, unless the plural is explicitly excluded from the specific context. Furthermore, as used in this description and throughout the scope of all patent applications described below, the meaning of "within" can include "within" and "above", unless the content clearly dictates otherwise. The terms used throughout the specification and the scope of all patent applications, unless otherwise specified, usually have the ordinary meaning of each term used in the field, within the context of the disclosure and in the context of the specification. Certain terms used to describe the present disclosure will be discussed below or elsewhere in this description to provide practitioners with additional guidance on the description of the present disclosure. Examples anywhere throughout this description, including the use of examples of any word discussed herein, are intended to be illustrative only, and certainly not to limit the scope and meaning of the disclosure or of any exemplified word. As such, the present disclosure is not limited to various embodiments set forth in this description.

In addition, any direct and indirect means of electrical connection is included herein if the term "electrical coupling" or "electrical connection" is used. For example, if a first device is described herein as being electrically coupled to a second device, it means that the first device may be directly coupled to the second device, or indirectly coupled to the second device through other devices or connection means. In addition, while the description relates to transmission and provision of electrical signals, those skilled in the art will appreciate that the transmission process of electrical signals may be accompanied by attenuation or other non-ideal changes. However, if there is no special description of the source and receiving end of the transmission or provision of electrical signals, they should be considered essentially the same signal. For example, if an electrical signal S is transmitted (or provided) from an endpoint A of an electronic circuit to an endpoint B of an electronic circuit, a voltage drop may occur through the source and drain terminals of a transistor switch and/or possible stray capacitance, but the purpose of this design is not to intentionally use the attenuation or other non-ideal changes generated during transmission (or provision) to achieve certain specific technical effects, and the electrical signal S should be considered essentially the same signal at the endpoint A and the endpoint B of the electronic circuit.

It is to be understood that the terms "comprising", "including", "having", "containing", "involving", and the like, as used herein, are open-ended, i.e., mean to include, but not limited to. In addition, it is not necessary for any embodiment of the present invention or the claims to achieve all of the objects, advantages or features disclosed in the present invention. In addition, the abstract and title are only used to assist in the search for patent documents and are not intended to limit the scope of patent applications for inventions.

The following describes an electrostatic discharge device. The electrostatic discharge device uses at least two conductive materials or at least two sensing electrodes isolated from each other to effectively dissipate an extremely high electrostatic voltage from an insulated fluid-carrying member or a sealed insulation container and avoid noise interference at a grounding terminal.

FIG. 1 is a schematic diagram of a first embodiment of an electrostatic discharge device of the present invention. Referring to FIG. 1, there is shown a first embodiment of an electrostatic discharge device 1 of the present invention. The electrostatic discharge device includes at least two electrically conductive materials 10 isolated from each other and at least one electrostatic eliminator 11. For clarity and convenience, the first embodiment takes two conductive materials 10 and one electrostatic eliminator 11 as an example. The two conductive materials 10 are located outside two opposite side walls of an insulated fluid-carrying member 2, overlap each other, and are separated from the side walls of the insulated fluid-carrying member 2 by means of an insulated fluid-carrying member. The electrostatic eliminator 11 is electrically connected to the conductive materials 10 and directly disconnected from a grounding terminal, thereby preventing noise from flowing from the grounding terminal to electrostatic eliminator 11. The insulated fluid-carrying member 2 may be, but is not limited to, an insulation container or an insulated hollow pipeline. When the insulated fluid-carrying member 2 is deformed, moved, rotated or motioned, neither the conductive materials 10 nor elements electrically connected thereto interfere with the action of the insulated fluid-carrying member 2. The conductive materials 10 may be, but are not limited to, metal sheets, conductive adhesive tapes, conductive adhesive, conductive paint, or metal electroplating materials. When a fluid carrying electrostatic charges flows in the insulated fluid-carrying member 2 and frictionates the insulated fluid-carrying member 2, the electrostatic charges are accumulated on the insulated fluid-carrying member 2 and form an electrostatic voltage on the conductive materials 10. The fluid can be, but is not limited to, any of liquid, gas, powder, moving solid, flowable or rolling solid, two-phase fluid, multiphase fluid, etc. that can flow along a pipeline or in a coating fluid, causing static electricity to be generated inside the tube wall. To ensure efficient collection of static electricity, a capacitance value between the conductive materials 10 and a dielectric substance of the conductive materials is greater than 0.2 picofarad (pF). In a first embodiment, the dielectric substance includes air, a fluid and an insulated fluid-carrying member 2. The electrostatic eliminator 11 releases and eliminates the electrostatic charges by means of the conductive materials 10 so as to reduce the electrostatic voltage. In general conditions, the larger the capacitance value corresponding to the conductive materials 10 is, the more the collected static electricity is, and the better the effect of electrostatic dissipation is. In other words, the larger the overlapping area of the conductive materials 10 and the smaller the distance between the conductive materials 10, the better the discharge effect can be achieved by the electrostatic discharge device 1.

Figure 2:
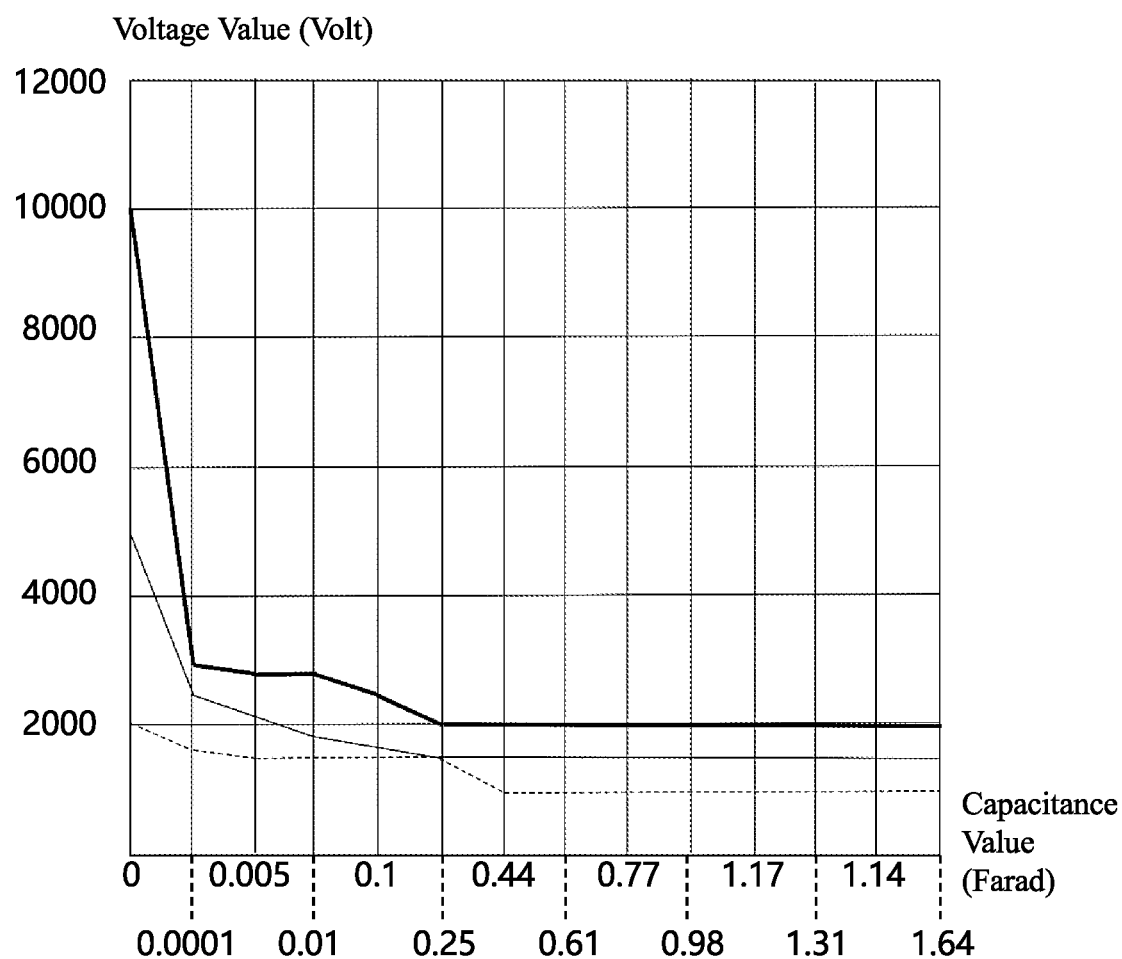
FIG. 2 is a graph showing capacitance values versus electrostatic voltages at different friction velocities according to an embodiment of the present invention.

FIG. 2 is a graph showing capacitance values and electrostatic voltages at different friction velocities according to an embodiment of the present invention. Please refer to FIGS. 1 and 2, the horizontal axis in FIG. 2 represents the capacitance value corresponding to the conductive materials 10, the vertical axis represents the electrostatic voltage on the conductive materials 10, the dash line represents that the initial electrostatic voltage is 2000 volts, the thin solid line represents that the initial electrostatic voltage is 5000 volts, and the thick solid line represents that the initial electrostatic voltage is 10000 volts. It can be seen from FIG. 2 that the higher the capacitance value corresponding to the conductive materials 10 is, the lower the electrostatic voltage on the conductive materials 10 is, the more the collected static electricity is, and the better the effect of electrostatic dissipation is.

Figure 3:
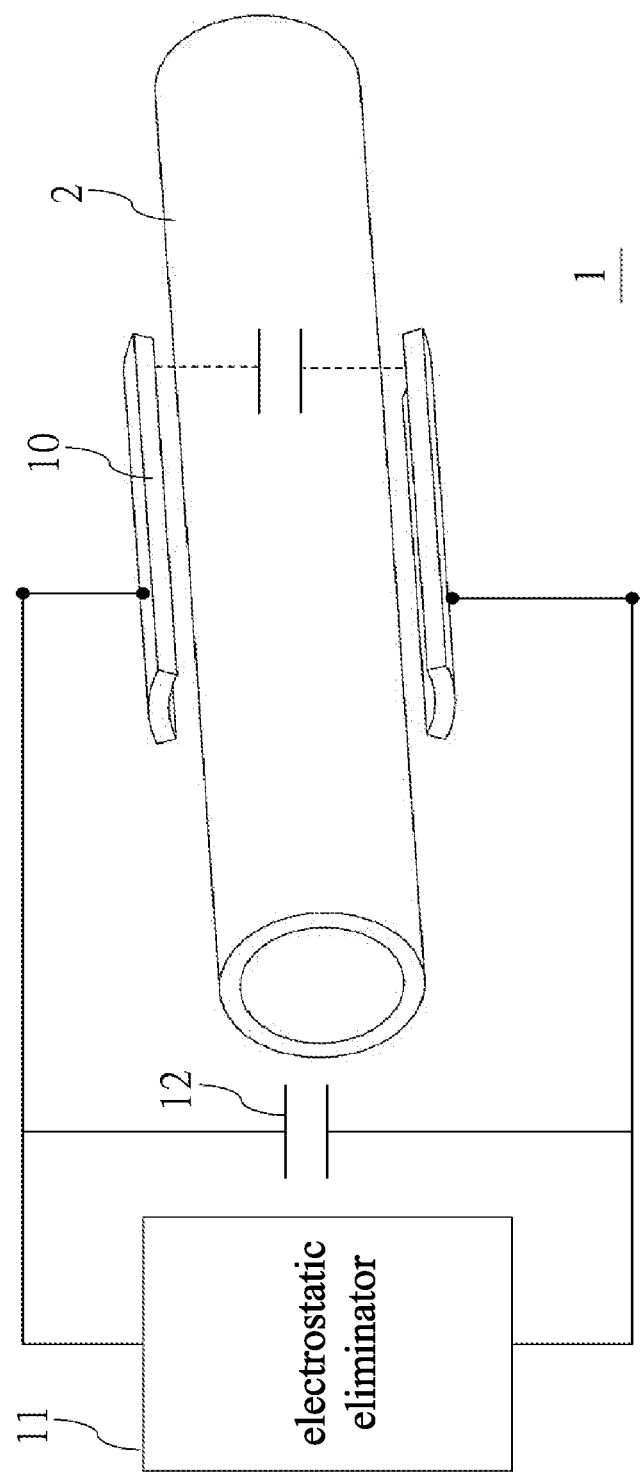
FIG. 3 is a schematic diagram of a second embodiment of an electrostatic discharge device of the present invention.

Practically, the area of the conductive materials 10 and the length or material of the insulated fluid-carrying member 2 may be limited by the space, resulting in insufficient capacitance of the conductive materials 10 to reduce the efficiency of collecting static electricity. FIG. 3 is a schematic diagram of a second embodiment of an electrostatic discharge device of the present invention. As shown in FIG. 3, the difference between the second embodiment and the first embodiment is that the second embodiment further includes an external capacitor 12, in which both ends of the external capacitor are electrically connected to two conductive materials 10. The external capacitor 12 and the conductive materials 10 have a larger capacitance value to collect more electrostatic charges for the electrostatic eliminator 11 so as to release and eliminate same.

Figure 4:
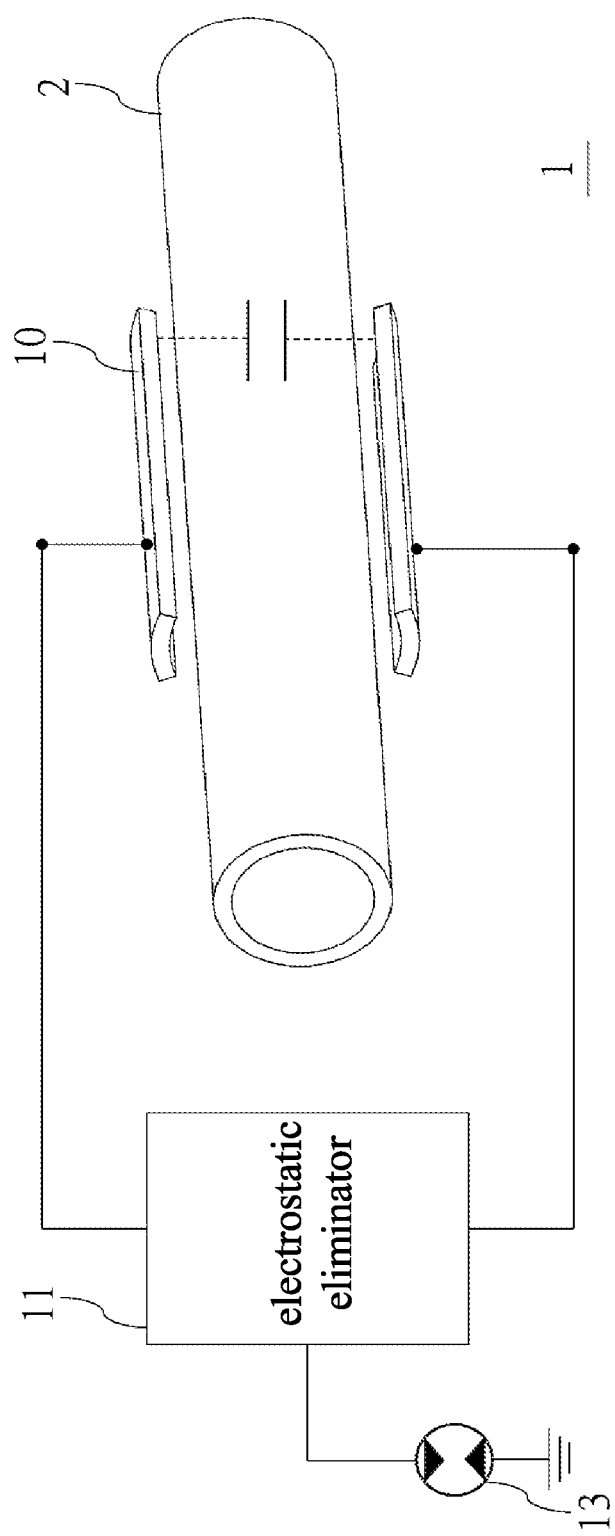
FIG. 4 is a schematic diagram of a third embodiment of an electrostatic discharge device of the present invention.

FIG. 4 is a schematic diagram of a third embodiment of an electrostatic discharge device of the present invention. As shown in FIG. 4, the difference between the third embodiment and the first embodiment is that the third embodiment further includes a gas discharge tube 13, which is electrically connected between the grounding terminal and the electrostatic eliminator 11. The gas discharge tube 13 releases and removes the electrostatic charges. When the speed at which electrostatic charges are generated or accumulated is too fast, the amount of dispersion of static electricity is made too low, or the dispersion speed is made too slow, the gas discharge tube 13 can be used to increase the amount of dissipation or dispersion speed of static electricity.

Figure 5:
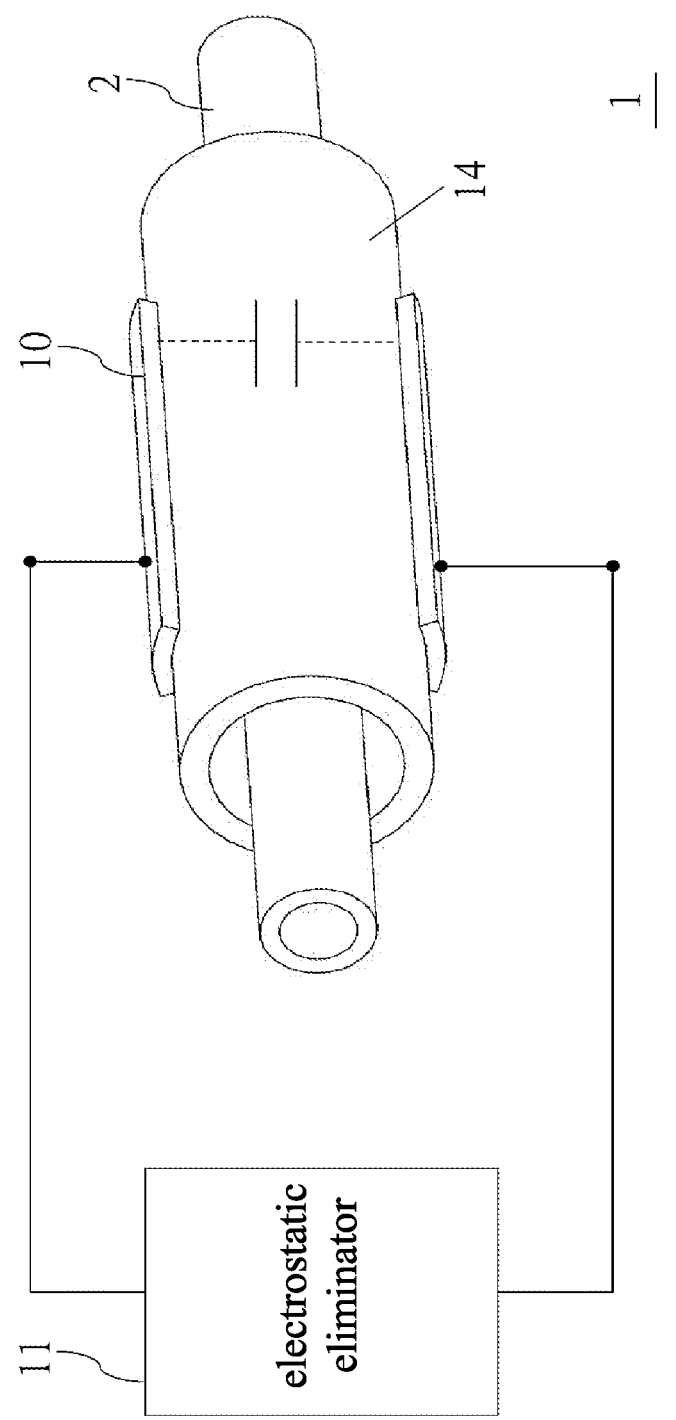
FIG. 5 is a schematic diagram of a fourth embodiment of an electrostatic discharge device of the present invention.

FIG. 5 is a schematic diagram of a fourth embodiment of an electrostatic discharge device of the present invention. As shown in FIG. 5, the difference between the fourth embodiment and the first embodiment is that the fourth embodiment fourth embodiment further includes a hollow insulated sleeve 14 sleeved with the insulated fluid-carrying member 2 and separated from the insulated fluid-carrying member 2, and the conductive materials 10 are directly attached to an inner wall or an outer wall of the hollow insulated sleeve 14. In the fourth embodiment, the conductive materials 10 are directly attached to an outer wall of the hollow insulated sleeve 14. The hollow insulated sleeve 14 does not interfere with the action of the insulated fluid-carrying member 2, and the insulated fluid-carrying member 2 can expand, deform, move or rotate in the hollow insulated sleeve 14. The hollow insulated sleeve 14 may be, but is not limited to, a flange, a motor, a pump, or a structure configured to secure the insulated fluid-carrying member 2.

Figure 6:
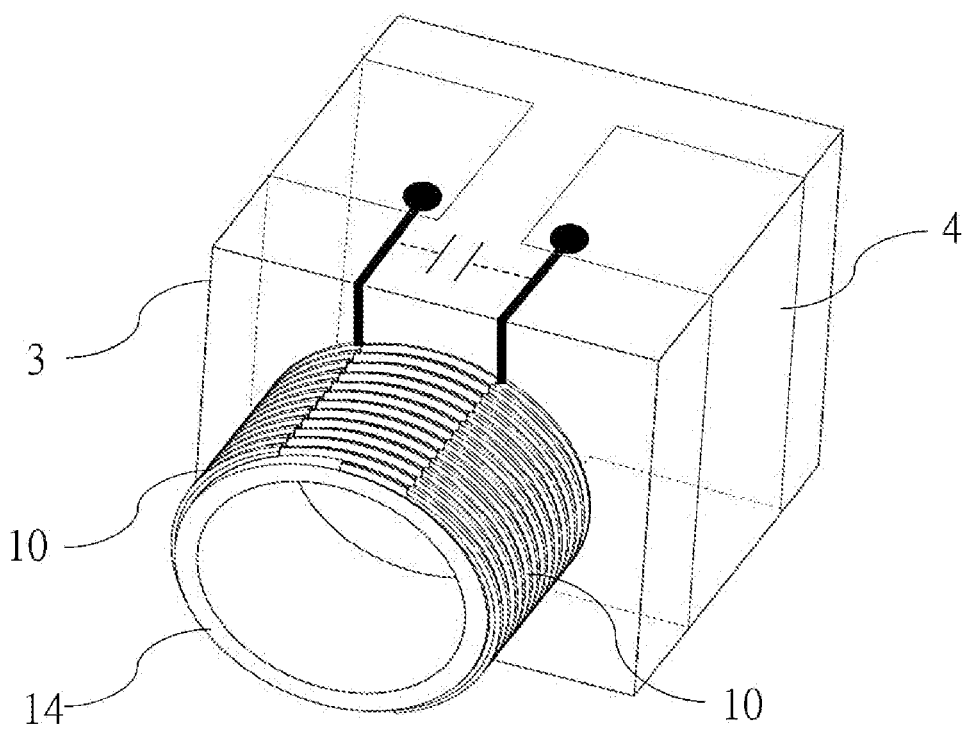
FIG. 6 is a schematic diagram of an embodiment of a hollow insulated sleeve of the present invention.

FIG. 6 is a schematic diagram of an embodiment of a hollow insulated sleeve of the present invention. Please refer to FIGS. 5 and 6, when the outer surface of the hollow insulated sleeve 14 is a non-smooth surface, such as a thread-shaped surface, the conductive material 10 may be implemented by a liquid conductive material, such as silver adhesive or silver paint. The conductive materials 10 are further electrically connected to a peripheral device 3, and two conductive sheets 4 are provided on the peripheral device to electrically connect the conductive materials 10. The conductive sheets 4 are configured to increase the capacitance value corresponding to the conductive materials 10, so as to increase the discharge effect.

Figure 7:
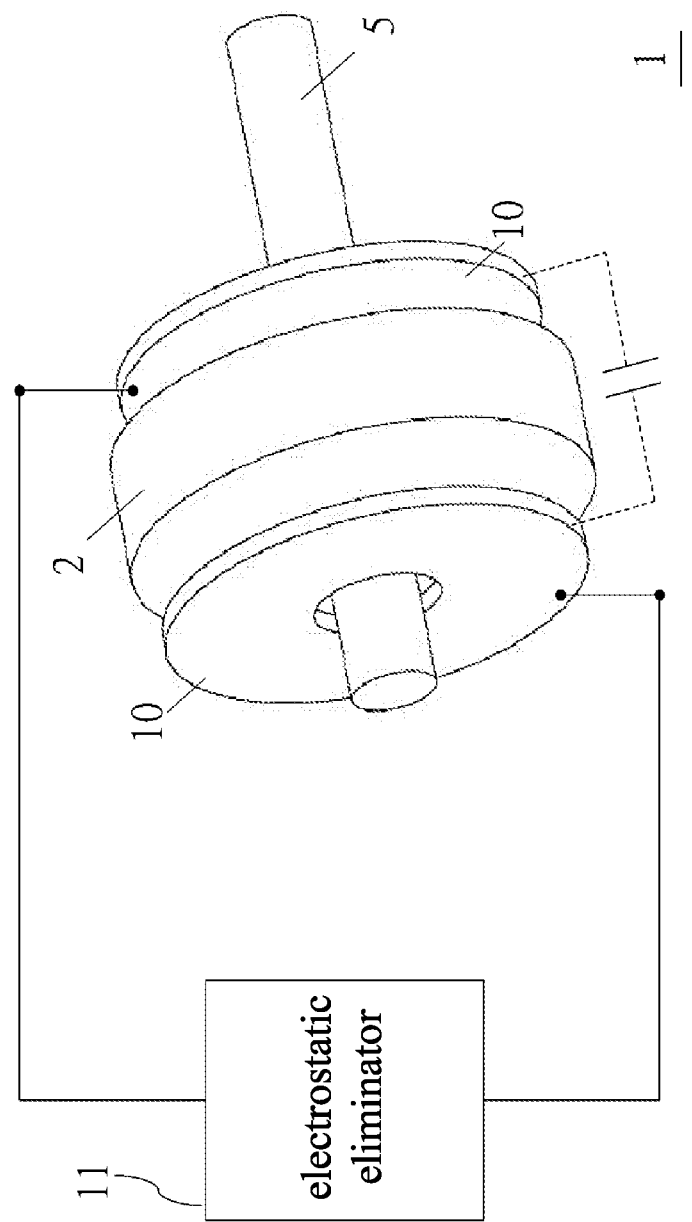
FIG. 7 is a schematic diagram of a fifth embodiment of an electrostatic discharge device of the present invention.

FIG. 7 is a schematic diagram of a fifth embodiment of an electrostatic discharge device of the present invention. Please refer to FIG. 7, the difference between the fifth embodiment and the first embodiment is that the insulation fluid-carrying member 2 of the fifth embodiment is implemented by sealing an insulation container. When the sealed insulation container moves, the fluid carrying the electrostatic charges flows in the sealed insulation container and frictionates the sealed insulation container, so that the electrostatic charges are accumulated on the insulation container. For example, the sealed insulation container may be fixed on a rotating shaft 5, and the rotating shaft 5 passes through the sealed insulation container. Each of the conductive materials 10 is a circular conductive material surrounding the rotating shaft 5. When the rotating shaft 5 drives the sealed insulation container to rotate, a fluid carrying electrostatic charges flows in the sealed insulation container and frictionates the sealed insulation container. In order to effectively collect and eliminate static electricity, the capacitance value corresponding to the conductive materials 10 becomes larger and better. Therefore, the sealed insulation container is implemented by using a cylinder, and the annular conductive material is provided outside the top surface and the bottom surface of the cylinder, so as to maximize a capacitance value corresponding to the conductive materials 10.

Figure 8:
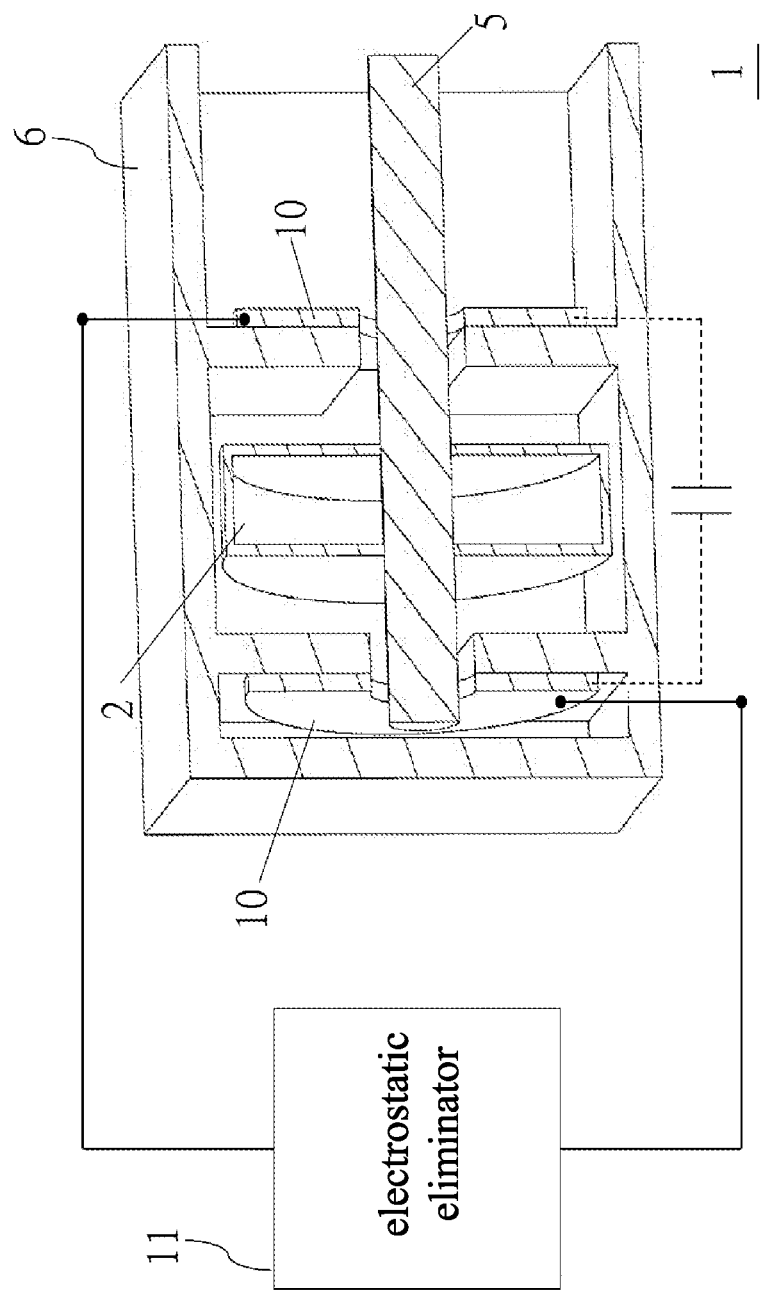
FIG. 8 is a schematic diagram of a sixth embodiment of an electrostatic discharge device of the present invention.

FIG. 8 is a schematic diagram of a sixth embodiment of an electrostatic discharge device of the present invention. Please refer to FIG. 8, the difference between the sixth embodiment and the fifth embodiment is that the sixth embodiment further includes an insulated accommodation sleeve 6 accommodating the rotating shaft 5, the sealed insulation container, and the annular conductive material, and the annular conductive material is fixed in the insulation accommodation sleeve 6. The insulation accommodation sleeve 6 does not interfere with the movement of the sealed insulation container. As the shape and the moving form of the insulated fluid-carrying member 2 may limit the layout of the conductive materials 10, the present invention does not limit the layout of the conductive materials 10. In the present invention, the position of the conductive materials 10 is determined at the point that the capacitance value corresponding to the conductive materials 10 is maximized, and the movement and reliability of the conductive materials 10 do not interfere with the insulated fluid-carrying member 2.

Figure 9:
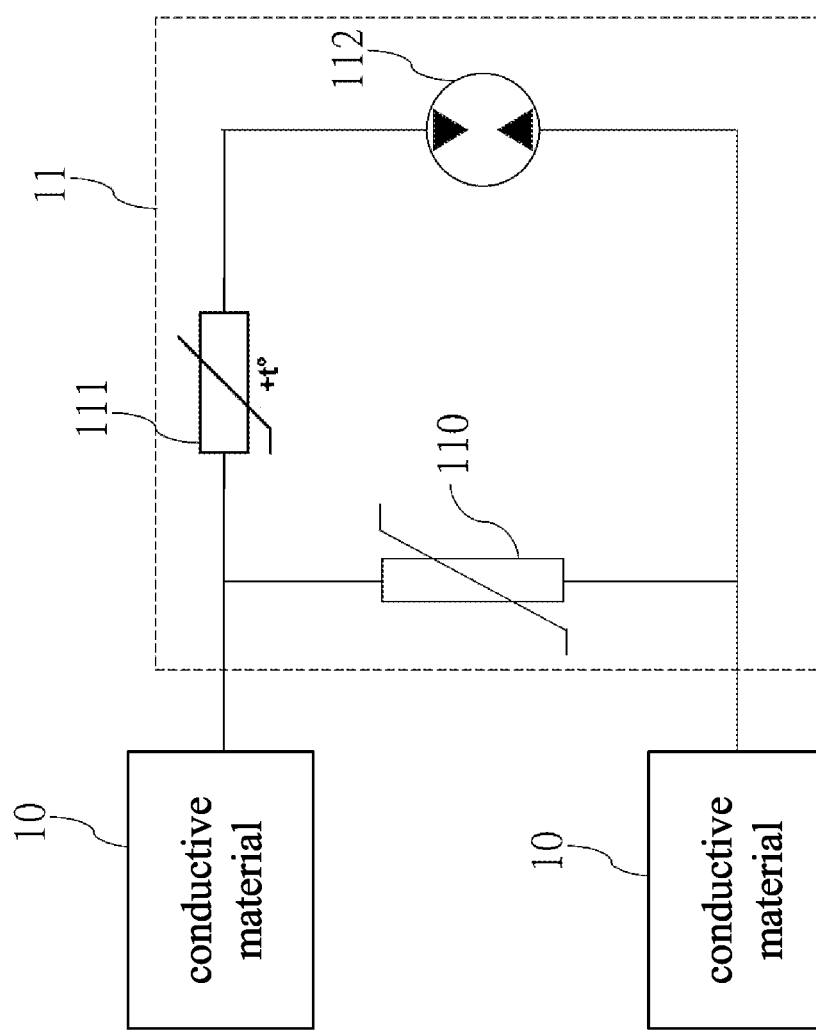
FIG. 9 is a schematic diagram of a first embodiment of an electrostatic eliminator of the present invention.

FIG. 9 is a schematic diagram of a first embodiment of an electrostatic eliminator of the present invention. Hereinafter, a first embodiment of the electrostatic eliminator 11 of the present invention will be described with reference to FIG. 9. The electrostatic eliminator 11 includes at least one metal oxide varistor 110, a thermistor 111, and at least one gas discharge tube 112. The thermistor 111 is a positive temperature coefficient (PTC) thermistor or a polymer positive temperature coefficient (PPTC) thermistor. For example, the number of the metal oxide varistor 110 and the gas discharge tube 112 are respectively one. The metal oxide varistor 110 has a first end and a second end, and the first end and the second end are electrically connected to the two conductive materials respectively. The thermistor 111 has a three end and a four end, and the third end is electrically connected to the first end of the metal oxide varistor 110. Both ends of the gas discharge tube 112 are electrically connected to the fourth end of the thermistor 111 and the second end of the metal oxide varistor 110 respectively. When the electrostatic voltage is greater than a rated voltage between the metal oxide varistor 110 and the gas discharge tube 112, the metal oxide varistor 110, the thermistor 111 and the gas discharge tube 112 release and eliminate the electrostatic charges, and the gas discharge tube 112 converts the electrostatic charges into optical energy so as to reduce the electrostatic voltage, so that the electrostatic voltage is equal to the rated voltage of the metal oxide varistor 110 or the gas discharge tube 112. Because the insulated fluid-carrying member 2 is not easy to maintain, in order to ensure reliability of the gas discharge tube 112, when the electrostatic voltage exceeds a rated voltage of the gas discharge tube 112, a voltage drop of the gas discharge tube 112 is zero, so that a high current passes through the thermistor 111. When the high current is greater than the trip current value of the thermistor 111, the thermistor 111 changes from low impedance to high impedance to block the passage of the high current, thereby protecting the gas discharge tube 112.

Figure 10:
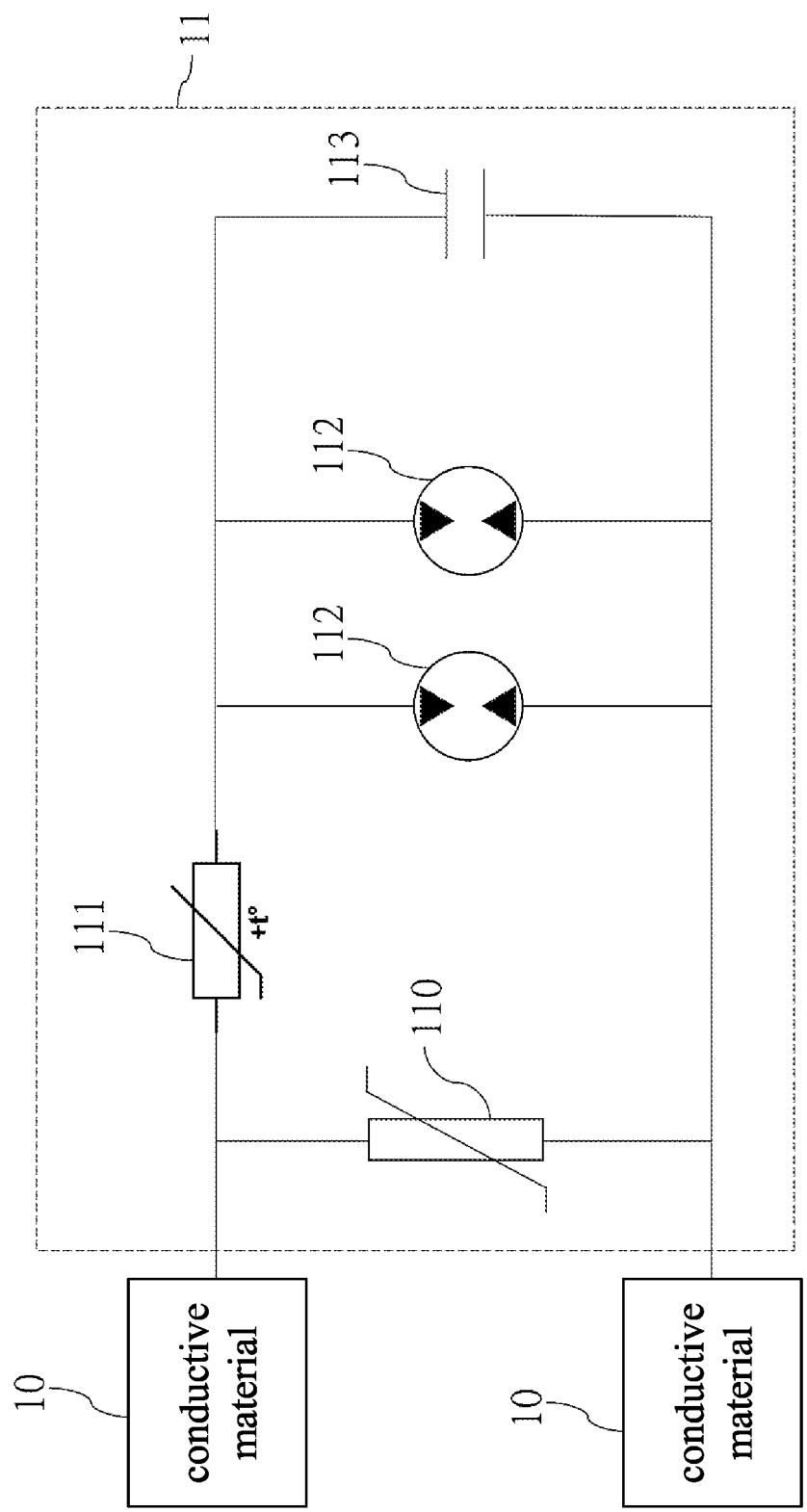
FIG. 10 is a schematic diagram of a second embodiment of an electrostatic eliminator of the present invention.

FIG. 10 is a schematic diagram of a second embodiment of the electrostatic eliminator of the present invention. Hereinafter, a second embodiment of the electrostatic eliminator 11 of the present invention will be described with reference to FIGS. 9 and 10. The difference between the electrostatic eliminator 11 in FIGS. 9 and 10 is that the static eliminator 11 in FIG. 10 further includes a current collection capacitor 113. In addition, the number of gas discharge tubes 112 is plural, taking two as an example. The electrostatic eliminator 11 is applied at extremely high electrostatic voltages to utilize its strong electrostatic dissipation ability to dissipate electrostatic charges. The rated voltages of all the gas discharge tubes 112 are different. The current collection capacitor 113 is electrically connected in parallel to the gas discharge tubes 112; an equivalent capacitance is formed between the two conductive materials 10 and the dielectric substance of the conductive materials; and the capacitance value of the current collection capacitor 113 is greater than ten times the capacitance value of the equivalent capacitor. When the electrostatic voltage is less than the rated voltage between the metal oxide varistor 110 and the gas discharge tubes 112, the electrostatic charges is first transferred from the insulated fluid-carrying member to the current collection capacitor 113 by means of the thermistor 111. When the electrostatic voltage is greater than a rated voltage between the metal oxide varistor 110 and the gas discharge tube 112, the metal oxide varistor 110, the thermistor 111 and the gas discharge tube 112 then release and eliminate the electrostatic charges, and the gas discharge tube 112 converts the electrostatic charges into optical energy so as to reduce the electrostatic voltage, so that the electrostatic voltage is equal to the rated voltage of the metal oxide varistor 110 or the gas discharge tube 112. Similarly, in order to ensure the reliability of all gas discharge tubes 112 and the current collection capacitor 113, when the electrostatic voltage exceeds a rated voltage of the gas discharge tube 112, a voltage drop of the gas discharge tube 112 is zero, so that a high current passes through the thermistor 111. When the high current is greater than the trip current value of the thermistor 111, the thermistor 111 changes from low impedance to high impedance to block the passage of the high current, thereby protecting all the gas discharge tube 112. In order to enhance the ability to dissipate static electricity, a plurality of metal oxide varistors 110 can also electrically bridged between the two conductive materials 10.

Figure 11:
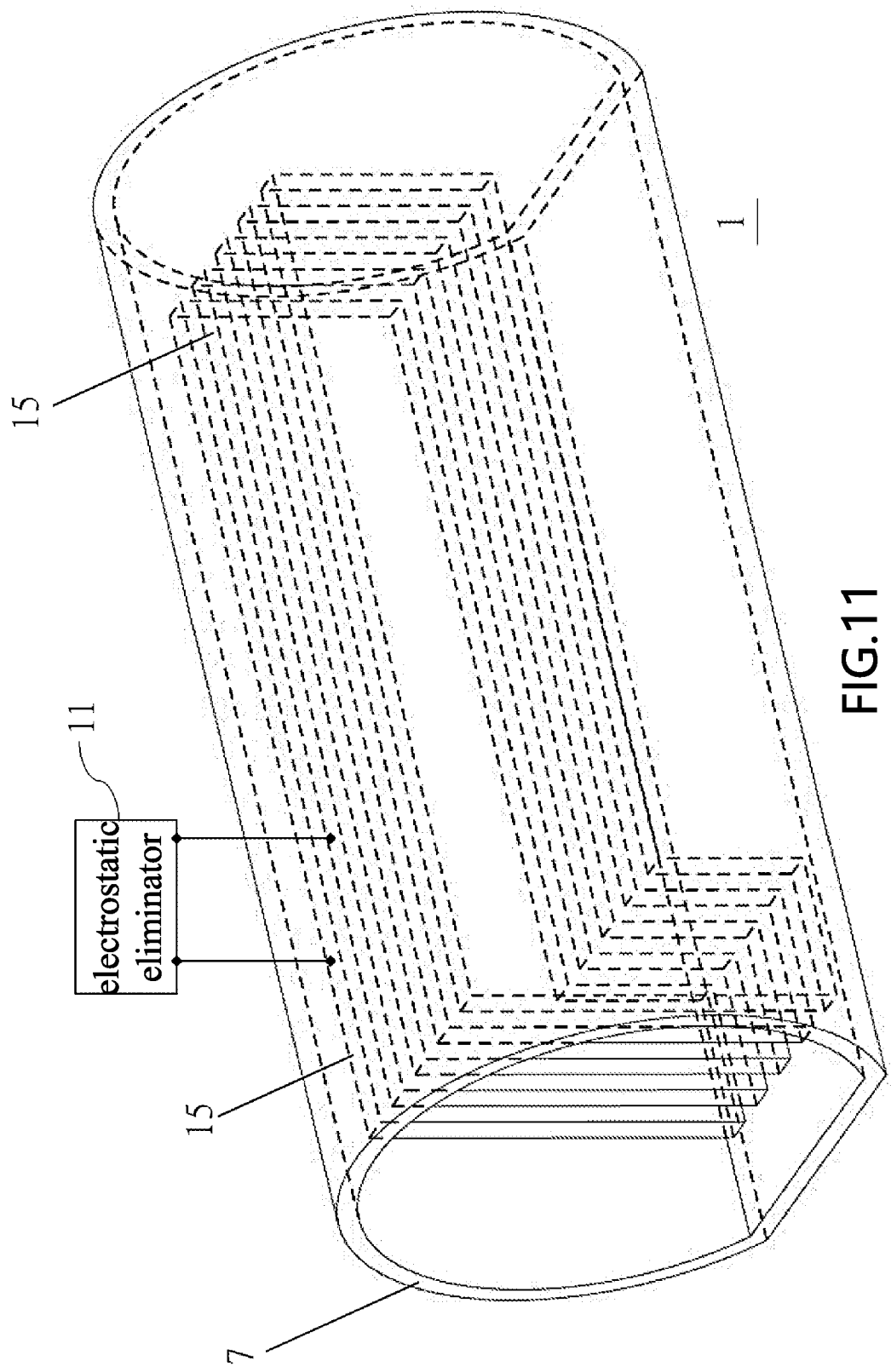
FIG. 11 is a schematic diagram of a seventh embodiment of an electrostatic discharge device of the present invention.
Figure 12:
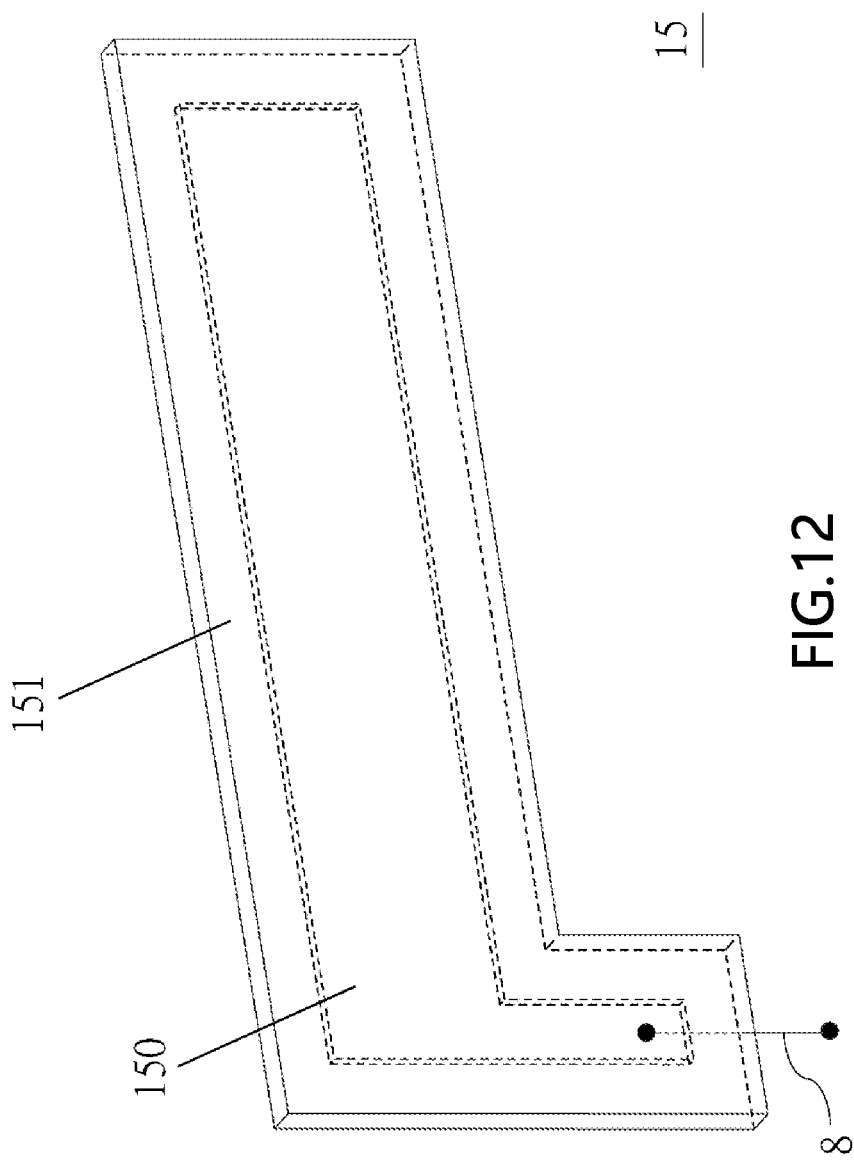
FIG. 12 is a schematic diagram of an embodiment of an electrode structure of the present invention.

FIG. 11 is a schematic diagram of a seventh embodiment of an electrostatic discharge device of the present invention; and FIG. 12 is a schematic diagram of an embodiment of an electrode structure of the present invention. Referring to FIGS. 11 and 12, there is shown a seventh embodiment of an electrostatic discharge device 1 according to the present invention comprising at least two electrode structures 15 and at least one electrostatic eliminator 11. For clarity and convenience, in the seventh embodiment, two electrode structures 15 and one electrostatic eliminator 11 are taken as an example. All the electrode structures 15 are located on an inner wall of an insulation container 7, and the positions of all the electrode structures 15 correspond to each other. For example, the insulation container 7 is an oil tank. When a fluid carrying electrostatic charges flows in the insulation container 7 and frictionates the insulation container 7, the electrostatic charges are accumulated on the insulation container 7. Each of the electrode structures 15 includes a sensing electrode 150 and an insulation cover 151 covering the sensing electrode 150. The material of the insulation cover 151 does not chemically react with the fluid, such as Teflon. The electrostatic charges form an electrostatic voltage on the sensing electrodes 150 of the electrode structures 15. In order to efficiently collect electrostatic charges, a capacitance value between the sensing electrodes 150 of all the electrode structures 15 and a dielectric substance of the electrode structures is greater than 0.2 picofarad (pF). In a seventh embodiment, the dielectric substance includes air and an insulation cover 151. The electrostatic eliminator 11 is electrically connected to the sensing electrodes 150 of all the electrode structures 15 and directly disconnected from a grounding terminal, thereby preventing noise from flowing from the grounding terminal to electrostatic eliminator 11. The electrostatic eliminator 11 releases and eliminates the electrostatic charges by means of the sensing electrode 150 of the electrode structures 15 so as to reduce the electrostatic voltage. In order to collect more electrostatic charges, a seventh embodiment may use a plurality of electrode structures 15 of which the number is greater than two, the number of all the electrode structures 15 is an even number, all the electrode structures 15 are located at the same horizontal position and are electrically connected to an electrostatic eliminator 11 by means of a wire 8. Each of the electrode structures 15 can be L-shaped, allowing the fluid to fully flow in the insulation container 7. Each of the electrode structures 15 does not affect the release of fluid from or storage of fluid in the insulation container 7.

Figure 13:
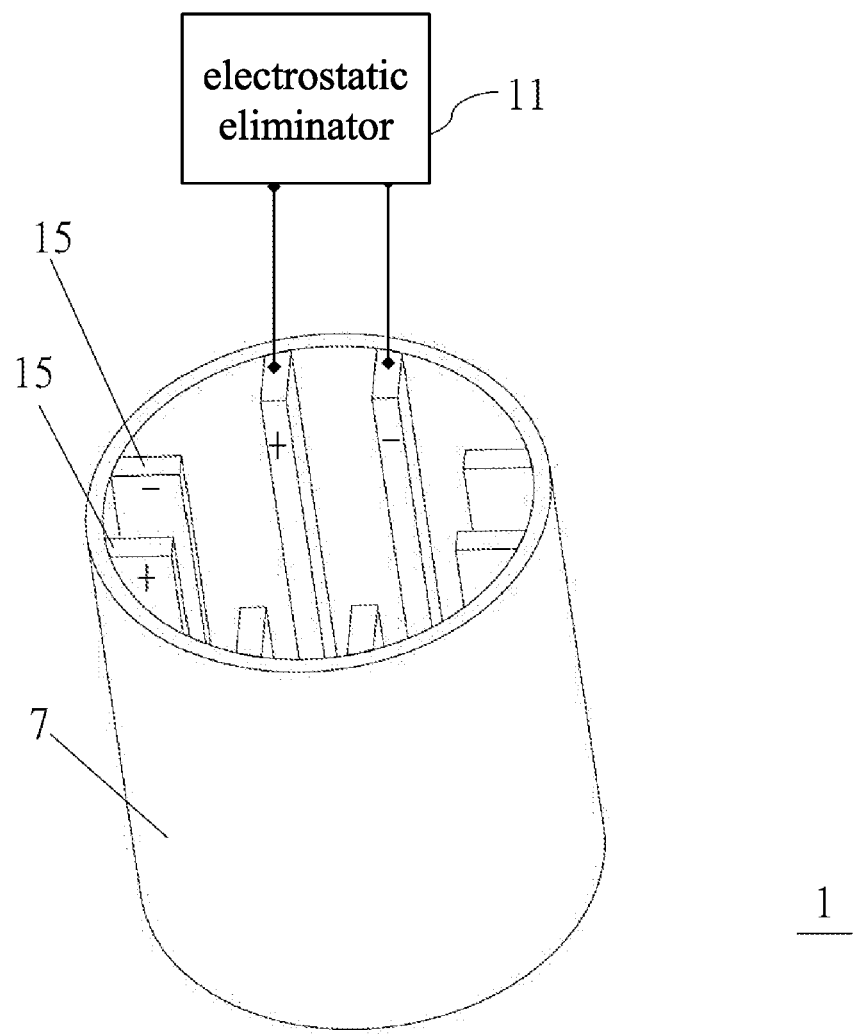
FIG. 13 is a schematic diagram of an eighth embodiment of an electrostatic discharge device of the present invention.
Figure 14:
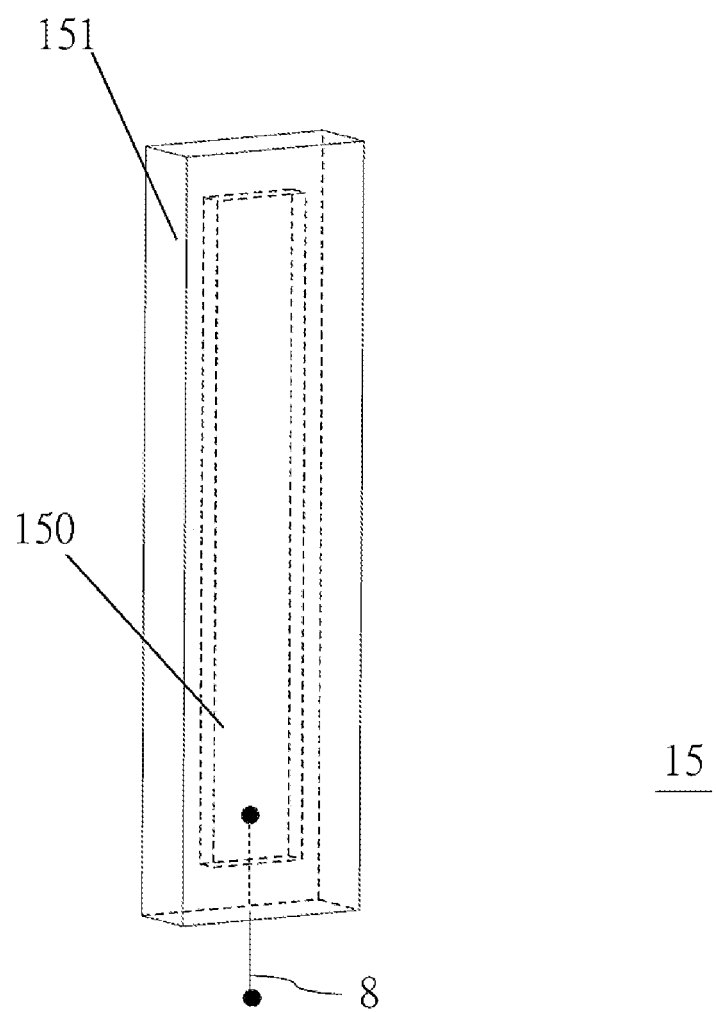
FIG. 14 is a schematic diagram of another embodiment of an electrode structure of the present invention.

FIG. 13 is a schematic diagram of an eighth embodiment of an electrostatic discharge device of the present invention; and FIG. 14 is a schematic diagram of another embodiment of an electrode structure of the present invention. Referring to FIGS. 13 and 14, an electrostatic discharge device 1 of an eighth embodiment of the present invention will be described. The difference between the eighth embodiment and the seventh embodiment is that, the electrode structures 15 of the eighth embodiment are uniformly located on the inner wall of the insulation container 7, the electrode structure 15 is in a long strip shape, and other features have been described in the seventh embodiment, which will not be repeated herein.

Figure 15:
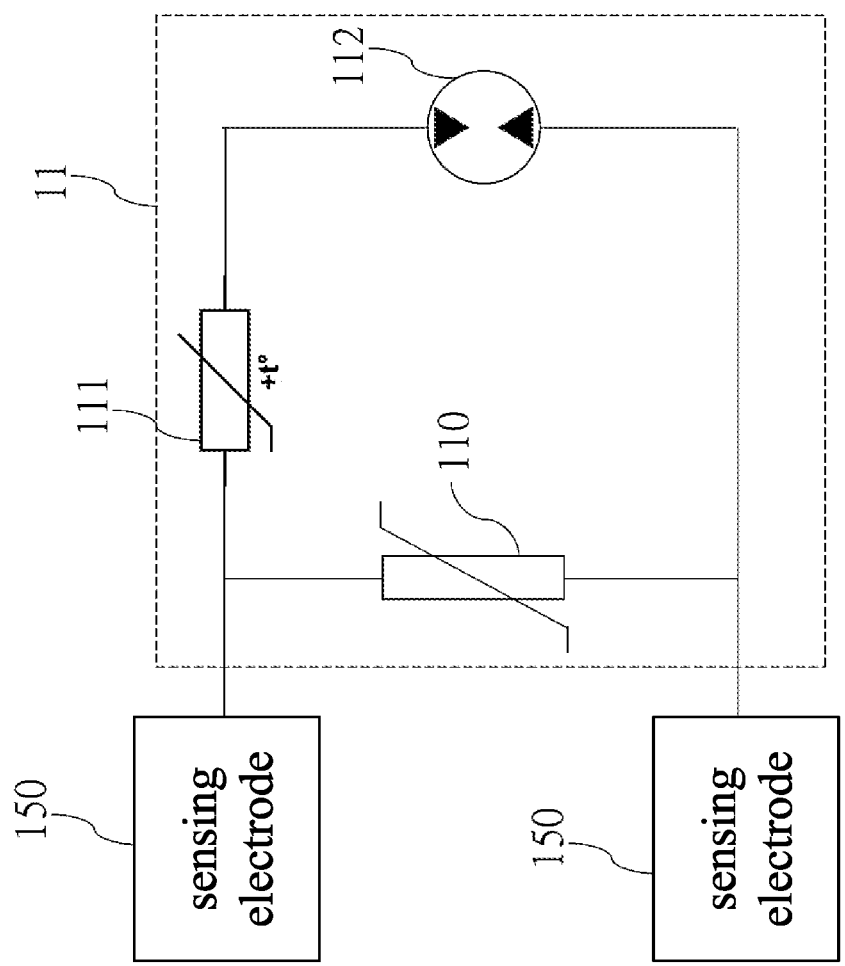
FIG. 15 is a schematic diagram of a third embodiment of an electrostatic eliminator of the present invention.

FIG. 15 is a schematic diagram of a third embodiment of an electrostatic eliminator of the present invention. Next, a third embodiment of the electrostatic eliminator 11 of the present invention will be described with reference to FIG. 15. The electrostatic eliminator 11 includes at least one metal oxide varistor 110, a thermistor 111, and at least one gas discharge tube 112. The thermistor 111 is a positive temperature coefficient thermistor or a polymer positive temperature coefficient thermistor. For example, the number of the metal oxide varistor 110 and the gas discharge tube 112 are respectively one. The metal oxide varistor 110 has a first end and a second end, and the first end and the second end are electrically connected to the sensing electrodes 150 of two electrode structures 15 respectively. The thermistor 111 has a three end and a four end, and the third end is electrically connected to the first end of the metal oxide varistor 110. Both ends of the gas discharge tube 112 are electrically connected to the fourth end of the thermistor 111 and the second end of the metal oxide varistor 110 respectively. When the electrostatic voltage is greater than a rated voltage between the metal oxide varistor 110 and the gas discharge tube 112, the metal oxide varistor 110, the thermistor 111 and the gas discharge tube 112 release and eliminate the electrostatic charges, and the gas discharge tube 112 converts the electrostatic charges into optical energy so as to reduce the electrostatic voltage, so that the electrostatic voltage is equal to the rated voltage of the metal oxide varistor 110 or the gas discharge tube 112. Because the sealed insulation container 7 is not easy to maintain, in order to ensure reliability of the gas discharge tube 112, when the electrostatic voltage exceeds a rated voltage of the gas discharge tube 112, a voltage drop of the gas discharge tube 112 is zero, so that a high current passes through the thermistor 111. When the high current is greater than the trip current value of the thermistor 111, the thermistor 111 changes from low impedance to high impedance to block the passage of the high current, thereby protecting the gas discharge tube 112.

Figure 16:
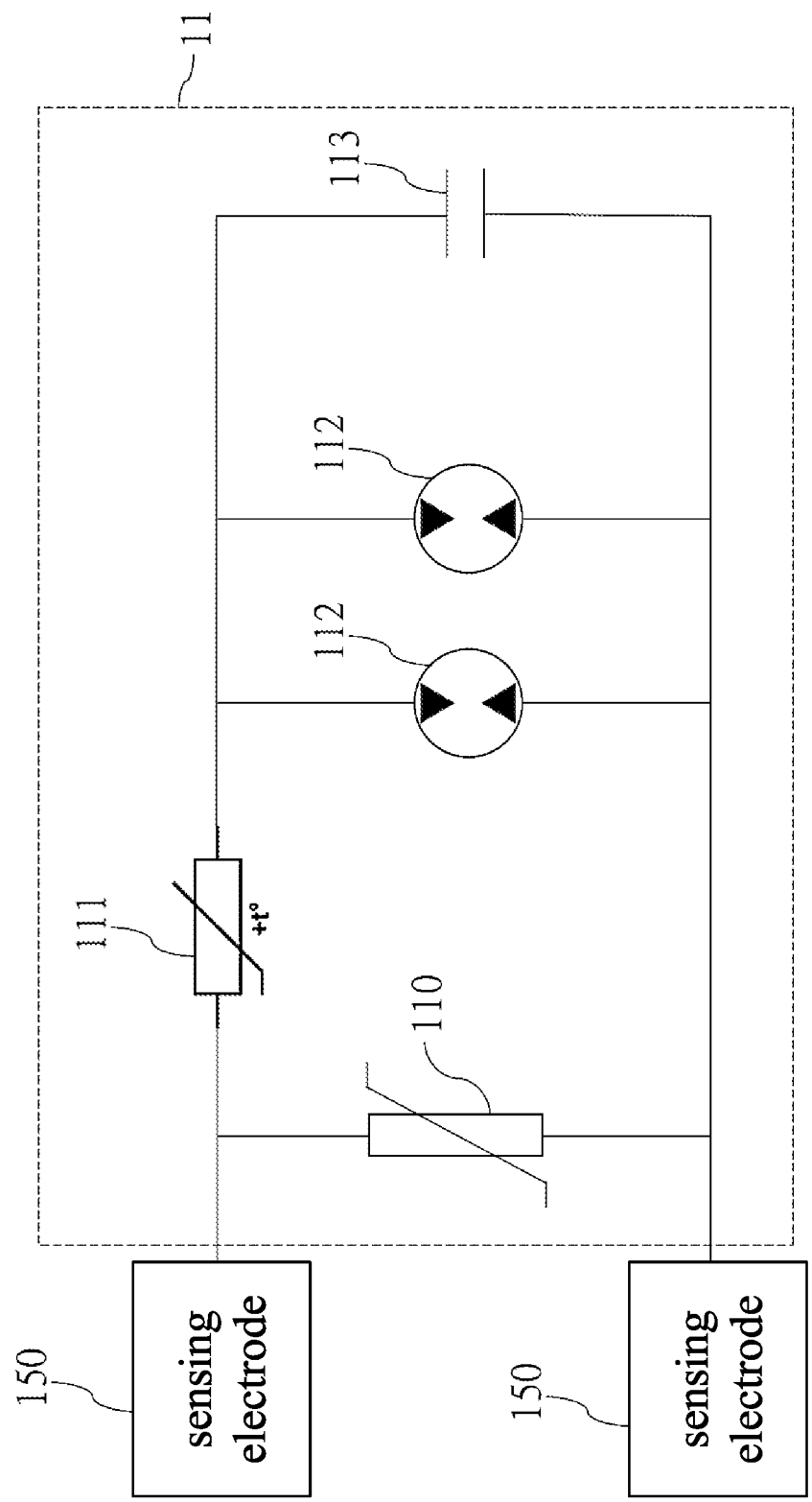
FIG. 16 is a schematic diagram of a fourth embodiment of an electrostatic eliminator of the present invention.

FIG. 16 is a schematic diagram of a fourth embodiment of an electrostatic eliminator of the present invention. Hereinafter, a fourth embodiment of the electrostatic eliminator 11 of the present invention will be described with reference to FIGS. 15 and 16. The difference between the electrostatic eliminator 11 in FIG. 15 and FIG. 16 is that the static eliminator 11 in FIG. 16 further includes a current collection capacitor 113. In addition, the number of gas discharge tubes 112 is plural, taking two as an example. The electrostatic eliminator 11 is applied at extremely high electrostatic voltages to utilize its strong electrostatic dissipation ability to dissipate electrostatic charges. The rated voltages of all the gas discharge tubes 112 are different. The current collection capacitor 113 is electrically connected in parallel to the gas discharge tubes 112; an equivalent capacitance is formed between the sensing electrodes 150 of two electrode structures 15 and the dielectric substance of the electrode structures; and the capacitance value of the current collection capacitor 113 is greater than ten times the capacitance value of the equivalent capacitor. When the electrostatic voltage is less than the rated voltage between the metal oxide varistor 110 and the gas discharge tubes 112, the electrostatic charges is first transferred from the insulation container to the current collection capacitor 113 by means of the thermistor 111. When the electrostatic voltage is greater than a rated voltage between the metal oxide varistor 110 and the gas discharge tube 112, the metal oxide varistor 110, the thermistor 111 and the gas discharge tube 112 then release and eliminate the electrostatic charges, and the gas discharge tube 112 converts the electrostatic charges into optical energy so as to reduce the electrostatic voltage, so that the electrostatic voltage is equal to the rated voltage of the metal oxide varistor 110 or the gas discharge tube 112. Similarly, in order to ensure the reliability of all gas discharge tubes 112 and the current collection capacitor 113, when the electrostatic voltage exceeds a rated voltage of the gas discharge tube 112, a voltage drop of the gas discharge tube 112 is zero, so that a high current passes through the thermistor 111. When the high current is greater than the trip current value of the thermistor 111, the thermistor 111 changes from low impedance to high impedance to block the passage of the high current, thereby protecting all the gas discharge tube 112. In order to enhance the ability to dissipate static electricity, a plurality of metal oxide varistors 110 can also electrically bridged between the two electrode structures 150.

According to the above embodiments, the electrostatic discharge device uses at least two conductive materials or at least two sensing electrodes isolated from each other to effectively dissipate an extremely high electrostatic voltage from an insulated fluid-carrying member or an insulation container and avoid noise interference at a grounding terminal.

The foregoing descriptions are merely exemplary embodiments of the present invention, but are not intended to limit the scope of the present invention. Any variations and modifications, such as shapes, configurations, features, and spirit, which are described in the claims of the present invention, should be included in the claims of the present invention.

What is claimed is:

1. An electrostatic discharge device, comprising:
   at least two conductive materials, separating from each other, arranged on outer sides of two opposite side walls of an insulated fluid-carrying member and separated from the side walls of the insulated fluid-carrying member, wherein when a fluid carrying electrostatic charges flows through the insulated fluid-carrying member and rubs against the insulated fluid-carrying member, the electrostatic charges are accumulated on the insulated fluid-carrying member to generate an electrostatic voltage across the at least two conductive materials, and the at least two conductive materials and a dielectric substance therebetween have a capacitance greater than 0.2 picofarad (pF); and
   at least one electrostatic eliminator, electrically connected to the at least two conductive materials and directly disconnected from a grounding terminal, wherein the at least one electrostatic eliminator is configured to discharge and eliminate the electrostatic charges through the at least two conductive materials so as to reduce the electrostatic voltage;
   wherein the insulated fluid-carrying member is a sealed insulated container, and when the sealed insulated container moves, the fluid carrying the electrostatic charges flows through the sealed insulated container and rubs against the sealed insulated container.

2. The electrostatic discharge device of claim 1, further comprising an external capacitor, wherein both ends of the external capacitor are electrically connected to the at least two conductive materials respectively, and the external capacitor and the at least two conductive materials are configured to collect the electrostatic charges.

3. The electrostatic discharge device of claim 1, further comprising a gas discharge tube electrically connected between the grounding terminal and the at least one electrostatic eliminator, wherein the gas discharge tube is configured to discharge and eliminate the electrostatic charges.

4. The electrostatic discharge device of claim 1, further comprising a hollow insulated sleeve sleeving the insulated fluid-carrying member and separating from the insulated fluid-carrying member, wherein the at least two conductive materials are directly attached to an inner wall or an outer wall of the hollow insulated sleeve.

5. The electrostatic discharge device of claim 1, wherein the at least one electrostatic eliminator comprises:
   at least one metal oxide varistor (MOV) having a first end and a second end, wherein the first end and the second end of the at least one metal oxide varistor are electrically connected to the at least two conductive materials respectively;
   a thermistor having a third end and a fourth end, wherein the third end of the thermistor is electrically connected to the first end of the at least one metal oxide varistor; and
   at least one gas discharge tube, wherein both ends of the at least one gas discharge tube are electrically connected to the fourth end and the second end respectively; and when the electrostatic voltage is greater than rated voltages of the at least one metal oxide varistor and the at least one gas discharge tube, the at least one metal oxide varistor, the thermistor and the at least one gas discharge tube are configured to discharge and eliminate the electrostatic charges so as to reduce the electrostatic voltage.

6. The electrostatic discharge device of claim 5, wherein the thermistor is a positive temperature coefficient (PTC) thermistor or a polymer positive temperature coefficient (PPTC) thermistor.

7. The electrostatic discharge device of claim 5, wherein the at least one gas discharge tube comprises two gas discharge tubes, and the rated voltages of the gas discharge tubes are different; the at least one electrostatic eliminator further comprises a charge-collecting capacitor electrically connected in parallel to the gas discharge tubes; the at least two conductive materials and a dielectric substance therebetween form an equivalent capacitor; a capacitance of the charge-collecting capacitor is greater than ten times a capacitance of the equivalent capacitor; when the electrostatic voltage is less than the rated voltages of the at least one metal oxide varistor and the gas discharge tubes, the electrostatic charges are transferred from the insulated fluid-carrying member to the charge-collecting capacitor through the thermistor; when the electrostatic voltage is greater than the rated voltages of the at least one metal oxide varistor and the gas discharge tubes, the at least one metal oxide varistor, the thermistor and the gas discharge tubes are configured to discharge and eliminate the electrostatic charges so as to reduce the electrostatic voltage.

8. The electrostatic discharge device of claim 1, wherein the at least two conductive materials are metal sheets, conductive adhesive tapes, conductive adhesive, conductive paint, or metal electroplating materials.

9. The electrostatic discharge device of claim 1, wherein the sealed insulated container is fixed to a rotating axle penetrating through the sealed insulated container, and each of the at least two conductive materials is an annular conductive material surrounding the rotating axle.

10. The electrostatic discharge device of claim 9, further comprising an insulated accommodation sleeve accommodating the rotating axle, the sealed insulated container, and the annular conductive materials, wherein the annular conductive materials are fixed in the insulated accommodation sleeve.

* * * * *